(12) United States Patent
Wooters

(10) Patent No.: US 6,538,198 B1
(45) Date of Patent: Mar. 25, 2003

(54) MARINE UMBILICAL

(76) Inventor: Timothy M. Wooters, P.O. Box 283, County Rd. 943, West Columbia, TX (US) 77486

(*) Notice: Subject to any disclaimer, the term of this patent is extended or adjusted under 35 U.S.C. 154(b) by 0 days.

(21) Appl. No.: 09/577,628

(22) Filed: May 24, 2000

(51) Int. Cl.$^7$ .................................................. H01B 7/00
(52) U.S. Cl. ........................ 174/47; 174/96; 174/101.5; 174/110 R; 138/111; 138/118
(58) Field of Search .................. 174/47, 14 R, 174/70 R, 96, 98, 99 R, 101.5, 110 R; 138/111, 118

(56) References Cited

U.S. PATENT DOCUMENTS

| | | | | |
|---|---|---|---|---|
| 4,196,307 A | * | 4/1980 | Moore et al. | 174/47 |
| 4,336,415 A | | 6/1982 | Walling | 174/47 |
| 4,476,923 A | | 10/1984 | Walling | 166/65 |
| 4,630,970 A | * | 12/1986 | Gunderson et al. | 405/224 |
| 4,726,314 A | | 2/1988 | Ayers | 114/243 |
| 5,044,826 A | | 9/1991 | Forster | 405/169 |
| 5,052,444 A | * | 10/1991 | Messerly et al. | 138/125 |
| 5,170,011 A | * | 12/1992 | Martucci | 174/47 |
| 5,188,872 A | | 2/1993 | Quigley | 428/36.2 |
| 5,192,167 A | | 3/1993 | da Silva et al. | 405/195.1 |
| 5,285,204 A | | 2/1994 | Sas-Jaworsky | 340/854.9 |
| 5,330,807 A | | 7/1994 | Williams | 428/34.5 |
| 5,483,022 A | | 1/1996 | Mar | 174/128.1 |
| 5,570,437 A | * | 10/1996 | Kluth et al. | 385/12 |
| 5,580,626 A | | 12/1996 | Quigley et al. | 428/36.2 |
| 5,688,571 A | | 11/1997 | Quigley et al. | 428/36.1 |
| 5,764,835 A | | 6/1998 | Rubin et al. | 385/104 |
| 5,828,003 A | | 10/1998 | Thomeer et al. | 174/69 |
| 5,888,601 A | | 3/1999 | Quigley et al. | 428/36.1 |
| 5,902,958 A | | 5/1999 | Haxton | 174/47 |
| 5,904,445 A | | 5/1999 | Meuth | 405/195.1 |
| 5,908,049 A | | 6/1999 | Williams et al. | 138/125 |
| 5,913,337 A | | 6/1999 | Williams et al. | 138/125 |
| 5,921,285 A | | 7/1999 | Quigley et al. | 138/125 |
| 5,933,945 A | | 8/1999 | Thomeer et al. | 29/825 |
| 5,944,099 A | | 8/1999 | Sas-Jaworsky | 166/77.2 |
| 5,988,702 A | | 11/1999 | Sas-Jaworsky | 285/249 |
| 6,044,038 A | | 3/2000 | Allensworth | 367/16 |
| 6,239,363 B1 | * | 5/2001 | Wooters | 174/47 |
| 6,355,879 B1 | * | 3/2002 | Bertini et al. | 174/47 |

OTHER PUBLICATIONS

Dunlop Coflexip Umbilicals Ltd.; *DUCO Brochure Ltd.*; pp. 1–26; 1991.
Kvaerner Enery a.s; *Kvaerner Umbilicals Product Brochure*; pp. 1–20; Mar. 1993.
Coflexip Stena Offshore; *Pipe and Umbilical Brochure*; pp. 1–20; 1996.
Alcatel; *Total offshore cable systems brochure*; pp. 1–34; Aug. 1998.
Duco Umbilical Systems; *Duco Umbilical Systems* Brochure; all; Apr. 1999.

* cited by examiner

Primary Examiner—Dean A. Reichard
Assistant Examiner—W. David Walkenhorst
(74) Attorney, Agent, or Firm—Timothy M. Honeycutt

(57) ABSTRACT

Various embodiments of an umbilical are provided. In one aspect, an umbilical is provided that includes a first tube, a second tube positioned in the first tube and a plurality of third tubes positioned in the first tube. Each of the plurality of third tubes has an inner polymer sleeve and an outer sleeve of carbon fibers in an epoxy matrix positioned around the polymer sleeve. The composite tubes yield a lighter umbilical that is easier to handle than a comparably sized conventional umbilical incorporating steel inner tubing and is more tolerant of dynamic bending and hydrostatic pressure loading.

40 Claims, 4 Drawing Sheets

MARINE UMBILICAL

BACKGROUND OF THE INVENTION

1. Field of the Invention

This invention relates generally to marine umbilicals, and more particularly to a marine umbilical incorporating composite inner tubing for the conveyance of fluids and the enclosure of optical fibers and electrical conductors.

2. Description of the Related Art

The efficient manipulation of subsea wellheads requires an interface between a control or processing facility, such as a platform, a land base facility, a servicing vessel or and the subsea wellhead. It is frequently desirable to be able to remotely manipulate valves and other equipment as well as inject various servicing fluids into the wellhead and to transmit and receive signals and electrical power. Umbilicals are frequently used to provide this necessary interface.

Dynamic umbilicals are used to interface moveable objects, such a submersibles, floating platforms and servicing vessels with other structures, such as wellheads, other platforms or other structures. As the name implies, dynamic umbilicals are designed to withstand stresses due to bending, tension and torsion. The majority of these dynamic loads are due to ocean currents and wave action. Static umbilicals are designed largely for stationary deployment.

Many conventional umbilicals incorporate a plurality of internal steel tubes shrouded by an external plastic jacket. The steel tubes are designed to carry hydraulic fluids, hydration inhibitors, such as methanol, or other servicing fluids. In some cases, electrical conductors are positioned around the steel tubes. Steel as an internal tube material presents several disadvantages associated with fatigue strength limitations, bending capacity, weight and cost. Fatigue strength places confines on the operation of the umbilical, particularly in dynamic contexts, such as connections to semi-submersible and fully submersible vehicles. In circumstances where high internal pressures are required within these steel tubes or high external hydrostatic pressures are present, the effect of fatigue loading can be more severe. As a consequence, the strain in the steel must be kept relatively low at normal operating conditions, and below the elastic limit of the steel even in the most extreme operating conditions.

Bending capacity is another limitation associated with umbilicals incorporating steel internal tubes. In order to maintain fatigue life and allowable stress levels within acceptable limits, the diameters of the internal steel tubes are restricted. Thus, the steel internal tubes may have relatively small diameters which translate into high head losses for fluids flowing therein.

Shear weight is another disadvantage associated with steel internal tubing in umbilicals. As the weight of the umbilical goes up, more of the total stress capacity of the umbilical must be devoted to tension and thus less is left over for bending stresses. In addition, heavier umbilicals require more robust handling equipment, such as winches, spools and the structures holding them, such as servicing vessels and/or platforms.

Material cost is another drawback associated with conventional steel umbilicals. Most conventional steel umbilical tubing is fabricated from sophisticated alloys that require complex hot and cold working. As many types of umbilicals may be thousands of feet in length, material costs due to the steel can soar.

Another type of conventional umbilical incorporates conventional hydraulic hoses within a plastic jacket. The hoses consist of a plastic tube reinforced externally by a wrapping of aramid and an outer wrapping of rubber or plastic. One disadvantage associated with this conventional internal tubing design is that aramid fiber jacketing is, like steel, prone to fatigue failure. In addition, there is typically no chemical bond between the aramid fibers and the core plastic tube. Thus, if the core plastic tube is perforated, or vice versa, if the outer plastic jacket is perforated, leakage may readily cascade through the perforation, through the aramid reinforcement and either into or out of the core plastic tube depending upon the pressure differential between the inside of the hose and the outside of the hose. A final disadvantage associated with conventional hydraulic internal tubing is a diminished ability to withstand the large external compressive forces due to hydrostatic pressure in deep water environments. In such circumstances, the conventional umbilical must be wrapped with a significant amount of armor wiring to protect the enclosed hydraulic hoses.

One conventional umbilical design proposed the incorporation of a composite center tube surrounded by a plurality of hydraulic lines and a number of power and signal conductors. The design advocated the use of a composite center tube only along with conventional hydraulic and conductor lines. Thus, the problems associated with steel tubing noted above remain.

The present invention is directed to overcoming or reducing the effects of one or more of the foregoing disadvantages.

SUMMARY OF THE INVENTION

In accordance with one aspect of the present invention, an umbilical is provided that includes a first tube and a second tube. The first tube and the second tube each have a polymer sleeve and an outer sleeve of fibers in an epoxy matrix positioned around the polymer sleeve. A third tube is provided that surrounds the first tube and the second tube.

In accordance with another aspect of the present invention, an umbilical is provided that includes a first tube and a second tube. The first tube and the second tube each have a polymer sleeve and an outer sleeve of carbon fibers in an epoxy matrix positioned around the polymer sleeve. A third tube is provided that surrounds the first tube and the second tube.

In accordance with another aspect of the present invention, an umbilical is provided that includes a first tube, a second tube positioned in the first tube and a plurality of third tubes positioned in the first tube. Each of the plurality of third tubes has an inner polymer sleeve and an outer sleeve of carbon fibers in an epoxy matrix positioned around the polymer sleeve.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
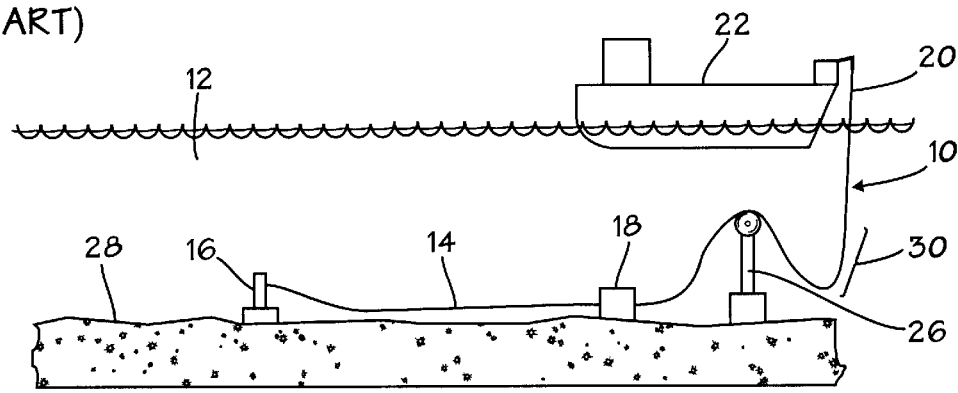
FIG. 1 is a side view of a typical conventional umbilical system deployed in a body of water.

In the drawings described below, reference numerals are generally repeated where identical elements appear in more than one figure. Turning now to the drawings, and in particular to FIG. 1, therein is shown a side view of a typical conventional umbilical system 10 deployed in a body of water 12. The system 10 includes a static umbilical 14 connected at one end to a subsea wellhead 16 and at the other end to a junction box 18. The junction box 18 interconnects the static umbilical 14 to a dynamic umbilical 20, which is deployed from a service vessel 22. The dynamic umbilical 20 is suspended on a mid-water arch 26 which is moored to the sea floor 28 so that the dynamic umbilical 20 includes a catenary section 30 that is more tolerant of vessel motion and may be more easily managed by the service vessel 22. As noted above, many conventional umbilicals incorporate a plurality of high cost alloy steel tubes for enclosing hydraulic fluids, well servicing fluids and/or electrical wiring. The use of steel as a tubing material adds significant weight to the dynamic umbilical 20, making the task of handling the dynamic umbilical 20 difficult and necessitating the use of relatively large service vessels and rigging equipment. Furthermore, metallic umbilical tubing can exhibit limited flexibility and thus present further limitations on the handling of the dynamic umbilical 20 by the service vessel 22. Furthermore, the incorporation of metallic umbilical tubing dictates different design philosophies for both the static umbilical 14 and the dynamic umbilical 20. Metallic tubing based umbilicals are not normally used in dynamic applications because the cyclic stresses imposed by currents and wave action can lead to fatigue failure.

Figure 2:
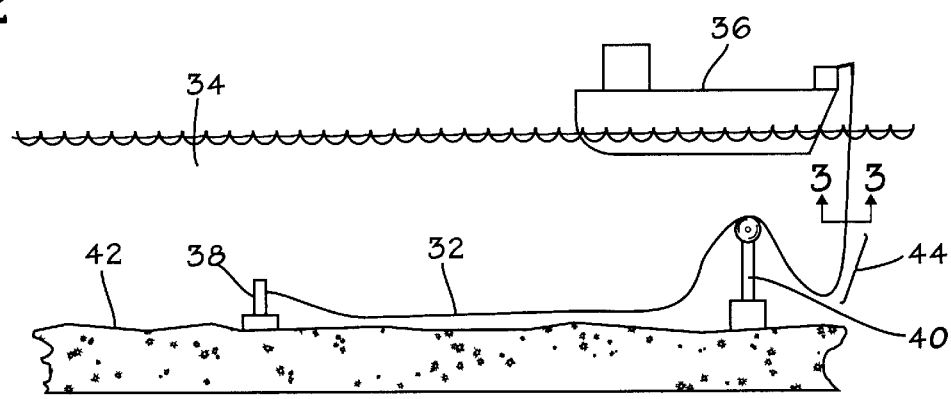
FIG. 2 is a side view of an exemplary embodiment of an umbilical in accordance with the present invention deployed in a body of water.

FIG. 2 depicts a side view of an exemplary embodiment of an umbilical 32 in accordance with the present invention deployed in a body of water 34. The umbilical 32 is used to connect a service vessel 36 to a subsea wellhead 38. The umbilical 32 may be used to transmit control signals from the service ship 36 to equipment on the wellhead 38 either by electronic signals or pressure pulses through a fluid and to deliver various well servicing fluids. The umbilical 32 may be partially suspended over a mid-water arch 40, which is moored to the sea floor 42. In this way, a portion 44 of the umbilical 32 may be suspended in the water in a catenary arrangement for better tolerance of vessel motion and manageability by the service vessel 36. Note that the umbilical 32 may be configured as a single segment as shown in FIG. 2 with the attendant elimination of the separate dynamic and static umbilical segments 14 and 20 and the junction box 18 disclosed in FIG. 1 above. This simplification in design is due largely to the weight savings and the bending strength properties associated with the configuration of the umbilical 32 as described more fully below. The umbilical 32 can serve both static and dynamic functions.

Figure 3:
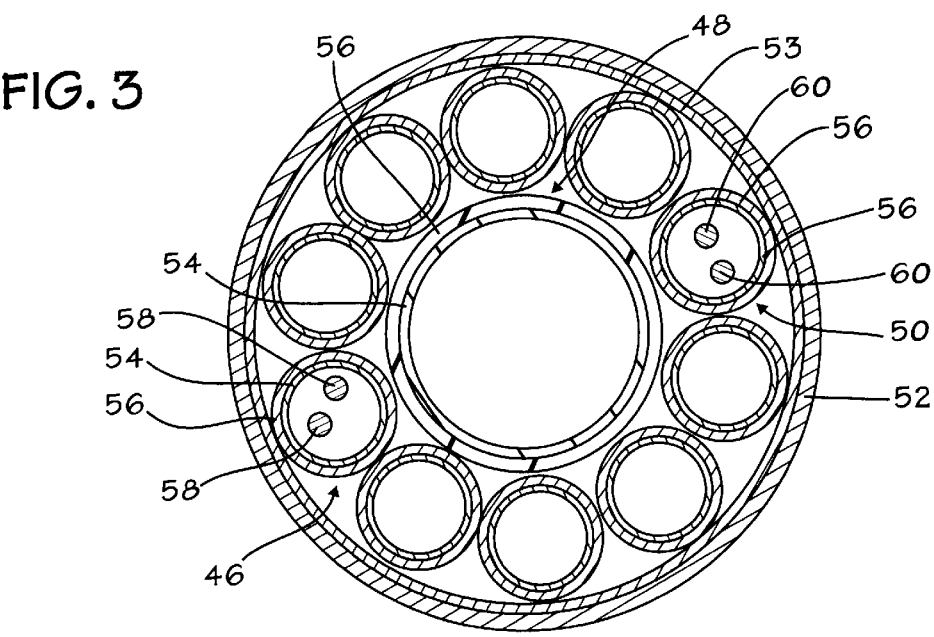
FIG. 3 is a cross-sectional view of the umbilical of FIG. 2 taken at section 3—3 in accordance with the present invention.

The detailed structure of the umbilical 32 may be understood by referring now to FIG. 3, which is a cross-sectional view of the umbilical 32 taken at section 3—3. The umbilical 32 includes a plurality of composite tubes, three of which are specifically designated 46, 48 and 50, surrounded by an external tube 52. Unless specified otherwise herein, recitation of the tubes 46, 48 and 50 refers to all of the tubes within the external tube 52. The composite tubes 46, 48 and 50 may be positioned in a parallel arrangement within the outer tube 52 or in a cabled arrangement wherein the tubes 46, 48 and 50 are twisted into a helical configuration. To facilitate the insertion of the tubes 46, 48 and 50 into the external tube 52, a binder tape 53 may be wrapped around the tubes 46, 48 and 50. The binder tape 53 and the external tube 52 may be composed of a polymer material, such as, for example, polyurethane, polyethylene, nylon or the like. The outer tube 52 is advantageously composed of a polymer material, such as, for example, polyurethane, polyethylene, nylon or the like. In addition, a synthetic roving may be used.

The tubes 46, 48 and 50 each include a polymer sleeve 54 and an outer sleeve 56 of fiber in an epoxy matrix. The tubes 46, 48 and 50 are designed to carry a variety of fluids, such as, for example, hydraulic oil, hydraulic fluid such as water and glycol, methanol for hydration suppression, or various other types of fluids used to service or manipulate subsea wells. In addition, the tubes 46, 48 and 50 may be used to enclose electrical conductors, such as the conductors 58 positioned in the tube 46 and fiber optic cables such as the cables 60 positioned in the tube 50. Optionally, the fiber optic cables and conductors may be positioned outside of the tubes 46, 48 and 50.

Figure 4:
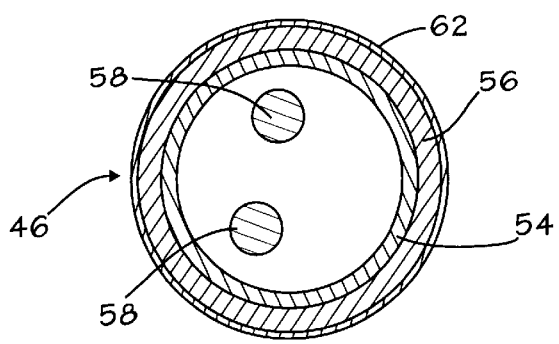
FIG. 4 is a magnified cross-sectional view of an exemplary internal tube of the umbilical of FIG. 3 in accordance with the present invention.

A more detailed cross-sectional view of the tube 46 is depicted in FIG. 4. The structure of the tube 46 will be illustrative of the structure of the other tubes in the umbilical 32. The polymer sleeve 54 is advantageously composed of a polymeric material which is resistant to permeation by methanol. A chemical barrier property is desirable so that tubes conveying various liquids do not become corrupted and leak fluids which may then attack electrical or fiber optic cabling within some of the other tubes within the umbilical 32. Exemplary materials for the polymer sleeve include, for example, cross-linked polyethylene, high density polyethylene, aliphatic poly-ketone, polyvinyladine difluoride, nylon or the like. A great variety of thermosetting or thermoplastic materials may be used.

The outer sleeve 56 is advantageously composed of reinforcing fibers in an epoxy matrix. Exemplary materials include, for example, carbon fiber, fiberglass, aramid fibers, combinations of these or the like in an epoxy matrix. Carbon fiber possesses superior wear and strength properties for dynamic flexing applications over various other reinforcing fiber materials. The epoxy matrix forms a tight bond with the exterior of the polymer sleeve 54 and thus provides a fluid tight barrier along the entire lengths of the polymer sleeve 54 and the outer sleeve 56. If desired, a wear layer 62 may be fabricated around the outer sleeve 56 to provide a relatively thin wear resistance coating to protect the underlying fiber reinforced outer sleeve 56. The wear layer 62 may be fabricated from materials, such as, for example, polyester or the like.

The combination of the inner polymer sleeve 54 and the outer sleeve 56 of fiber reinforcing in an epoxy matrix provides a relatively flexible, lightweight and high strength tube which yields an umbilical 32 with a much lighter total weight than a comparably configured conventional umbilical utilizing metallic tubing. Accordingly, the umbilical 32 exhibits greater bending flexibility and thus requires smaller umbilical handling equipment on the servicing vessel 36. Furthermore, the umbilical 32 does not require separate design configurations for static and dynamic umbilicals as is the case in conventional umbilical design. Rather, and as depicted in FIG. 2, a single umbilical segment may be used to connect a service vessel or platform to a subsea wellhead. The umbilical 32 also exhibits greater hydrostatic pressure crush resistance than steel tubes or hoses, and thus, can be used at greater depths.

Referring again to FIG. 3, the tubes 46 and 50 are provided with a diameter, d, that is smaller than the diameter, D, of the centrally positioned tube 48. This arrangement of a relatively large central tube 48 contemplates usage of the central tube 48 as a flow tube for a fluid that requires a relatively high flow rate, such as, for example, methanol or some other type of servicing fluid. However, the skilled artisan will appreciate that the sizes of the tubes 46, 48 and 50 are largely matters of design discretion.

For simplicity of illustration, only two electrical conductors 58 are illustrated in FIG. 4. However, the skilled artisan will appreciate that the number and configuration of conductors and/or fiber optic cables positioned within the umbilical 32 is largely a matter of design discretion.

Figure 5:
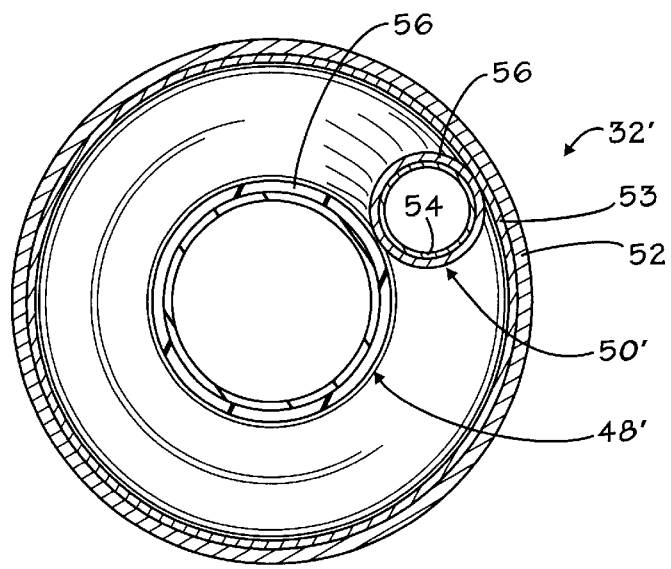
FIG. 5 is a cross-sectional view like FIG. 3 but depicting an alternate exemplary embodiment of an umbilical in accordance with the present invention.

FIG. 3 illustrates an embodiment of the umbilical 32 which includes eleven tubes, three of which are designated 46, 48 and 50, surrounded by an outer tube 52. However, the skilled artisan will appreciate that a great variety of composite tubing arrangements are envisioned within the scope of the present invention. For example, FIG. 5 depicts a cross-sectional view similar to FIG. 3 of an alternate exemplary embodiment of an umbilical 32' in accordance with the present invention. In this illustrative embodiment, two composite tubes 48' and 50' are positioned within an external tube 52. The tube 50' is cabled around the centrally disposed tube 48'. Like the embodiment disclosed in FIGS. 3 and 4, the tubes 48' and 50' each include a polymer sleeve 54 and an outer fiber reinforced sleeve 56.

Figure 6:
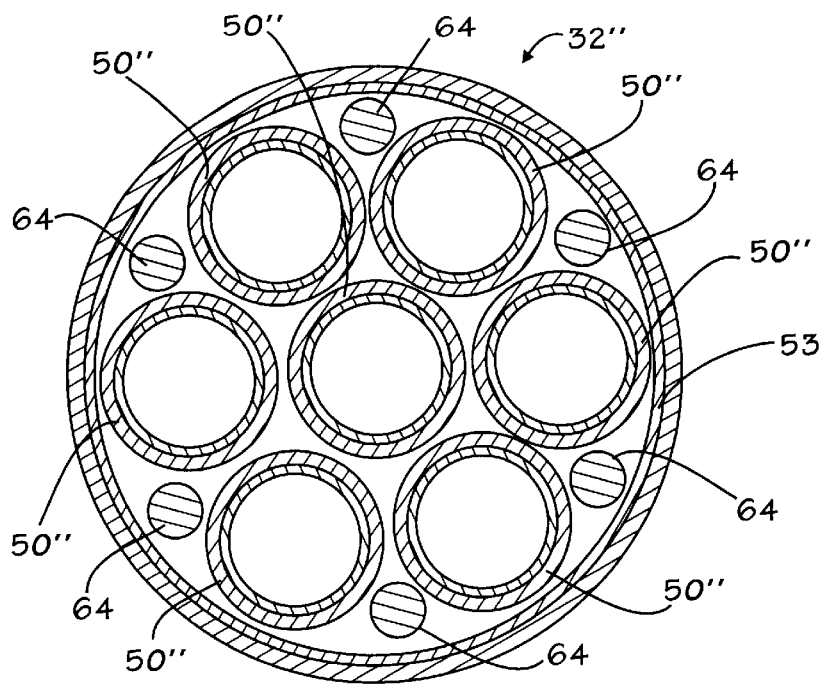
FIG. 6 is a cross-sectional view like FIG. 5 depicting another alternate exemplary embodiment of an umbilical in accordance with the present invention.

FIG. 6 depicts a cross-sectional view similar to FIG. 3 of another alternate exemplary embodiment of an umbilical 32" which incorporates a plurality of weight members 64 interspersed with a plurality of tubes 50". The tubes 50" and the weight member 64 are positioned within an outer tube 52 and may be wrapped with a binder tape 53 to facilitate application of the outer tube 52 as desired. The weight members 64 are incorporated to reduce the buoyancy of the umbilical 32" and thus facilitate a deployment of the umbilical 32" to the sea floor or at a depth that requires a diminished buoyancy. The number and configuration of the weight members 64 is largely a matter of design discretion. In an exemplary embodiment, the weight members consist of lead rods that may be coextensive with the length of the umbilical 32" or may be fashioned in shorter segments and spaced at intervals along the length of the umbilical 32" as desired. The tubes 50" may be configured like the tube 50 depicted in FIG. 3. Optionally, the buoyancy of the umbilical 32" may be reduced by introduction of a heavier-than-water liquid into the interstices between the tubes 50" and inside the tube 52. For example, heavy brine may be used.

Figure 7:
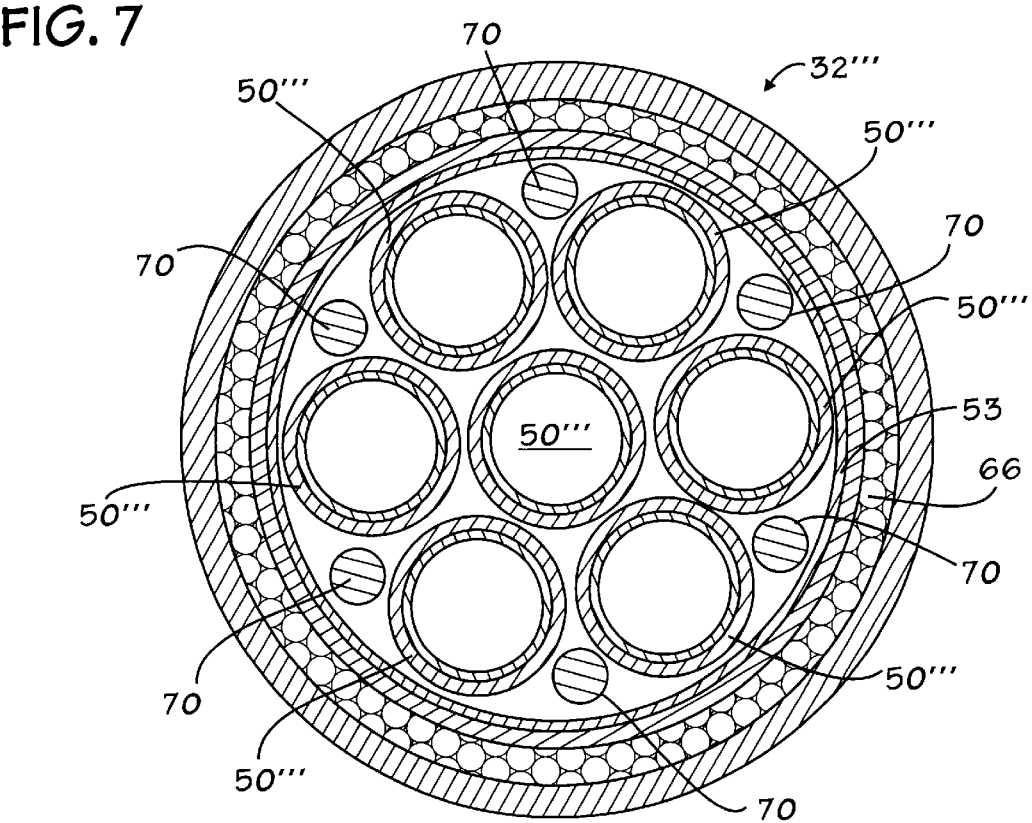
FIG. 7 is a cross-sectional view like FIG. 5 depicting another alternate exemplary embodiment of an umbilical in accordance with the present invention.

Another alternate exemplary embodiment of an umbilical 32'" is depicted in FIG. 7, which is a cross-sectional view similar to FIG. 6. In this illustrative embodiment, a reinforcing jacket 66 is positioned around the outer tube 52 to increase the strength and cut resistance of the umbilical 32'". The reinforcing jacket 66 is advantageously composed of a plurality of corrosion resistant armor wires of metallic or composite materials. The reinforcing jacket 66 is, in turn, shrouded by an outer tube 68, which may be composed of the same types of materials used to fabricate the outer tube 52. A plurality of tubes 50'" are positioned within the outer tube 52 and may be interspersed with tubular filler rods 70 or weight members 64 as shown in FIG. 6 as desired. The tubes 50'" may be configured like the tube 50 depicted in FIG. 3.

Figure 8:
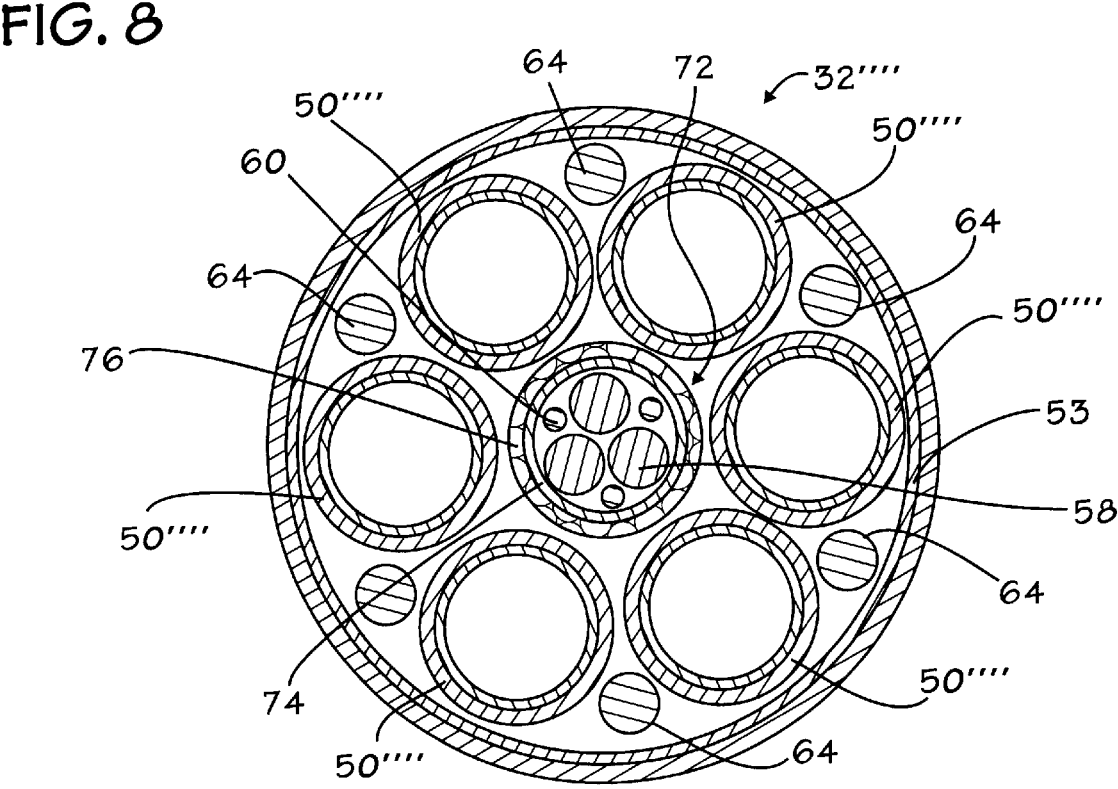
FIG. 8 is a cross-sectional view like FIG. 5 depicting another alternate exemplary embodiment of an umbilical in accordance with the present invention.

Another alternate exemplary embodiment of an umbilical 32'" in accordance with the present invention may be understood by referring now to FIG. 8, which is a cross-sectional view like FIG. 7. In this illustrative embodiment, an electrical/fiber optic tube 72 is positioned inside the outer tube 52 along with a plurality of composite tubes 50"". The tubes 50"" may be configured like the tube 50 depicted in FIG. 3. The electrical/fiber optic cable 72 includes an inner polymer sleeve 74 jacketed by a reinforcing sleeve 76 of armor wiring. One or more weight members 64 may be incorporated to reduce the buoyancy of the umbilical 32' as desired, or the weight members 64 may be augmented or supplanted with filler rods such as the rod 70 depicted in FIG. 7 and a reinforcing jacket 66 of the type depicted in FIG. 7 may be incorporated if desired. This embodiment may be useful in circumstances where the umbilical 32' may be deployed at great depths and there is risk of hydrostatic pressure damage to the electrical conductors 58 and the fiber optic cables 60.

The skilled artisan will appreciate that the various embodiments of the umbilicals disclosed herein in accordance with the present invention provide a useful umbilical for connecting a subsea well to various other installations, such as, for example, a servicing vessel, an offshore platform, an onshore facility or the like. The incorporation of non-metallic composite tubes greatly reduces the weight of the umbilical an increases the flexibility thereof. Smaller handling equipment may be used to deploy, move and retract the umbilical. Other than marine deployments are envisioned.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An umbilical, comprising:
   a first tube;
   a second tube, the first tube and the second tube each having a polymer sleeve and an outer sleeve of fibers in an epoxy matrix positioned around the polymer sleeve; and
   a third tube surrounding the first tube and the second tube.

2. The umbilical of claim 1, wherein the second tube is cabled around the first tube.

3. The umbilical of claim 1, wherein the first tube has a larger diameter than the second tube.

4. The umbilical of claim 1, wherein the first tube and the second tube have substantially the same diameter.

5. The umbilical of claim 1, wherein the polymer sleeve comprises a thermoplastic or thermosetting material.

6. The umbilical of claim 1, comprising a weight member positioned inside the third tube to affect the buoyancy of the umbilical.

7. The umbilical of claim 1, comprising a plurality of armor wires positioned around the third tube.

8. The umbilical of claim 7, comprising a fourth tube positioned around the plurality of armor wires.

9. The umbilical of claim 1, comprising a conductor positioned in the third tube.

10. The umbilical of claim 9, wherein the conductor is positioned in the second tube.

11. The umbilical of claim 1, comprising a fiber optic cable positioned in the third tube.

12. The umbilical of claim 11, wherein the fiber optic cable is positioned in the second tube.

13. The umbilical of claim 11, comprising a conductor positioned in the third tube.

14. An umbilical, comprising:

a first tube;

a second tube, the first tube and the second tube each having a polymer sleeve and an outer sleeve of carbon fibers positioned around the polymer sleeve; and a third tube surrounding the first tube and the second tube.

15. The umbilical of claim 14, wherein the carbon fibers are in an epoxy matrix.

16. The umbilical of claim 14, wherein the second tube is cabled around the first tube.

17. The umbilical of claim 14, wherein the first tube has a larger diameter than the second tube.

18. The umbilical of claim 14, wherein the first tube and the second tube have substantially the same diameter.

19. The umbilical of claim 14, wherein the polymer sleeve comprises a thermoplastic or thermosetting material.

20. The umbilical of claim 14, comprising a weight member positioned inside the third tube to affect the buoyancy of the umbilical.

21. The umbilical of claim 14, comprising a plurality of armor wires positioned around the third tube.

22. The umbilical of claim 21, comprising a fourth tube positioned around the plurality of armor wires.

23. The umbilical of claim 14 comprising a conductor positioned in the third tube.

24. The umbilical of claim 23, wherein the conductor is positioned in the second tube.

25. The umbilical of claim 14, comprising a fiber optic cable positioned in the third tube.

26. The umbilical of claim 25, wherein the fiber optic cable is positioned in the second tube.

27. The umbilical of claim 25, comprising a conductor positioned in the third tube.

28. An umbilical, comprising:

a first tube;

a second tube positioned in the first tube; and a plurality of third tubes positioned in the first tube, each of the plurality of third tubes having an inner polymer sleeve and an outer sleeve of carbon fibers in an epoxy matrix positioned around the polymer sleeve.

29. The umbilical of claim 28, wherein the second tube and the plurality of third tubes are cabled.

30. The umbilical of claim 28, wherein the second tube has a larger diameter than the diameters of the plurality of third tubes.

31. The umbilical of claim 28, wherein the second tube and the plurality of third tubes have substantially the same diameter.

32. The umbilical of claim 28, wherein the polymer sleeve comprises a thermoplastic or thermosetting material.

33. The umbilical of claim 28, comprising a weight member positioned inside the first tube to affect the buoyancy of the umbilical.

34. The umbilical of claim 28, comprising a plurality of armor wires positioned around the first tube.

35. The umbilical of claim 34, comprising a fourth tube positioned around the plurality of armor wires.

36. The umbilical of claim 28, comprising a conductor positioned in one of the plurality of third tubes.

37. The umbilical of claim 36, wherein the conductor is positioned in the second tube.

38. The umbilical of claim 28, comprising a fiber optic cable positioned in the third tube.

39. The umbilical of claim 38, wherein the fiber optic cable is positioned in the second tube.

40. The umbilical of claim 38, comprising a conductor positioned in the third tube.

* * * * *